(12) United States Patent
Chisholm et al.

(10) Patent No.: US 7,546,300 B2
(45) Date of Patent: Jun. 9, 2009

(54) SYSTEM FOR PROVIDING SECURE ACCESS

(75) Inventors: Gordon D. Chisholm, Perth (GB);
Richard A. Han, Angus (GB); Andrew Monaghan, Dundee (GB)

(73) Assignee: NCR Corporation, Dayton, OH (US)

( * ) Notice: Subject to any disclaimer, the term of this patent is extended or adjusted under 35 U.S.C. 154(b) by 350 days.

(21) Appl. No.: 11/159,082

(22) Filed: Jun. 22, 2005

(65) Prior Publication Data
US 2006/0010131 A1     Jan. 12, 2006

(30) Foreign Application Priority Data
Jul. 10, 2004   (GB) .................................. 0415525.5

(51) Int. Cl.
*G06F 17/00* (2006.01)
*G06F 17/30* (2006.01)
*G06F 11/00* (2006.01)

(52) U.S. Cl. ............................... 707/10; 726/2; 726/26; 707/9; 707/102

(58) Field of Classification Search ............... 707/1–10, 707/100–104.1, 200–205; 718/100–104; 726/2, 26
See application file for complete search history.

(56) References Cited

U.S. PATENT DOCUMENTS 6,236,996 B1   5/2001   Bapat et al.
6,871,346 B1 * 3/2005 Kumbalimutt et al. ...... 718/104

FOREIGN PATENT DOCUMENTS

EP   0 913 966 A3   12/1999

OTHER PUBLICATIONS http://www.mcpmag.com/columns/print.asp?EditorialsID=381, Securing Remote Management with WMI, R Bragg, Feb. 2002.
http://www.c-sharpcorner.com/Code/2004/March/WWIEventDetecting.asp, "Monitoring the Event Log Remotely using WMI in .NET", M Gold, Mar. 31, 2004.
http://www.globalmanagementconference.com/schedule/presentations/thursday/GMC03_315pm_Mapper.pdf, "WMI Mapper: Accessing WMI data using CIM XML", B Harrison, Jun. 2003.
http://news.zdnet.com/2100-3513_22-276303.html, "XP for slot machines, ATMs released", I Fried, Nov. 28, 2001.
http://msdn.microsoft.com/embedded/getstart/devplat/atm/kskovrvw/default/aspx.

\* cited by examiner

*Primary Examiner*—Hosain T Alam
*Assistant Examiner*—Navneet K Ahluwalia
(74) *Attorney, Agent, or Firm*—Michael Chan

(57) ABSTRACT

A system implementing secure access to management information, the system (96) comprising: an open management service (64) including an open management application programming interface (92); a managed object (18,30,50,66) generating management information; and an object interface (68,74) for (i) receiving management information from the object, (ii) converting the received management information into a format accessible to the open management service, and (iii) providing the management information to the open management service (64) in response to a valid request from a client (80). The system further comprises an authorization component (74a) for verifying an access code (86) associated with the request to determine if the client (80) is authorized to issue the request.

12 Claims, 9 Drawing Sheets

FIG. 6

| Name | Source | Resetable | Comments |
|---|---|---|---|
| Caption | MOF | N/A | "Pick Module Statistics" |
| Description | MOF | N/A | "Pick Module Statistics" |
| DeviceClass | MOF | N/A | "NCR_CashDispDevice" |
| DeviceInstance | Provider | N/A | Instance of the Device that these counters apply to. This is a Key attribute. |
| Name | MOF | N/A | "Pick Module Statistics" |
| ResetCounter | Provider | N/A | This method should be used to reset a specific counter. |
| PartId | Provider | N/A | The PartId for the particular Pick Module that this statistical object refers to. |
| BillsPicked | Provider | Yes | The number of bills picked since this counter was reset. |
| TotalBillsPicked | Provider | No | The total number of bills picked since installation. |
| ShortBillsPicked | Provider | Yes | The number of short bills picked since this counter was reset |
| LongBillsPicked | Provider | Yes | The number of long bills picked since this counter was reset |
| ExtraBillsPicked | Provider | Yes | The number of extra bills picked since this counter was reset |
| HoledBillsPicked | Provider | Yes | The number of holed bills picked since this counter was reset |
| DoubleBillsPicked | Provider | Yes | The number of double bills picked since this counter was reset |
| TripleBillsPicked | Provider | Yes | The number of triple bills picked since this counter was reset |
| PickFailures | Provider | Yes | The number of pick failures since this counter was reset |
| BillJams | Provider | Yes | The number of bill jams since this counter was reset |
| InvalidBillsPicked | Provider | Yes | The number of invalid bills picked since this counter was reset |

FIG. 7

| NCR Base CIM Class | Access Level | Description |
|---|---|---|
| NCR_Device | 0 | Everyone has access to this data it is the high level device information |
| NCR_DevicePart | 0 | Basic device sub-part information |
| NCR_ReplenishmentTask | 0 | First line maintenance tasks |
| NCR_SelfTest | 0 | Allows execution of a basic self test diagnostic command |
| NCR_MaintenanceTest | 0 | Allows execution of a maintenance tests |
| NCR_FRU | 0 | Allows identification of FRUs. |
| NCR_FirmwareControl | 1 | Allows firmware download. |
| NCR_MaintenanceTask | 1 | Second line maintenance tasks |
| NCR_Setting | 1 | Allows device configuration |
| NCR_Tamper | 1 | Allows detection of vandalism and fraud status |
| NCR_TamperDetails | 2 | Provides detailed information on vandalism and fraud status |
| NCR_StatisticalInformation | 2 | Allows viewing of device counters and enables FRU maintenance cycle management |
| NCR_Diagnostic | 2 | Allows the full set of diagnostic tests and detailed response data. |
| NCR_SensorData | 2 | Allows monitoring of detailed sensor information from a device. |

SYSTEM FOR PROVIDING SECURE ACCESS

BACKGROUND

The present invention relates to a system for providing secure access, and to a secure access method. In particular, the present invention relates to a system and method for providing secure access to management information in an open management system.

Open management systems are non-proprietary management systems that use standard technology to allow client programs to access management information in an enterprise environment. Open management systems provide a consistent definition and structure of data, including expressions for elements such as object classes, properties, associations and methods.

To ensure interoperability across a network comprising different types of programs and devices, where these programs and devices are provided by different vendors, open management systems provide an interface for requesting and for describing data about programs and devices. This interface enables administrators and software management programs to access the same type of information from many different types of devices and programs on different platforms (for example, different operating systems) using the same commands.

This open management system interface is made publicly available to allow clients to be programmed to browse and query management information via the management system. The management information may relate to software resources (such as installed programs), and/or hardware resources (such as storage devices, and memory).

It is proposed herein to use an open management system in a self-service terminal (SST), such as a kiosk or an automated teller machine (ATM).

Self-service terminals are generally public-access devices that are designed to allow a user to conduct a transaction or to access information in an unassisted manner and/or in an unattended environment. SSTs typically include some form of tamper resistance (in both hardware and software) so that they are inherently resilient to faults and unauthorized access. SSTs include: ATMs; non-cash kiosks that allow users to access information (for example, to view reward points on a reward card the user has present to the SST); and kiosks that accept payment for services (for example, Web surfing kiosks, photo printing kiosks, kiosks that allow users to buy goods, and such like). The term SST has a relatively broad meaning and may include vending machines and photocopiers.

An ATM is one type of SST, and typically includes a cash dispenser for dispensing currency to a user subsequent to identifying the user and validating that the user has sufficient funds to cover the amount of currency to be dispensed.

An ATM includes a variety of different hardware devices, and typically executes an operating system, a run-time platform to augment the operating system, and one or more control programs.

The run-time platform is used for (i) interfacing with the operating system, (ii) providing device drivers for non-standard computing devices (for example, cash dispenser devices), and (iii) providing industry-standard interfaces (application programming interfaces (APIs)) to the control program and any other programs executing on the ATM. These industry-standard interfaces enable the control program to use standard commands (i) to make use of self-service devices (PIN pads, cash dispensers, and such like), and (ii) to obtain device status and fault management information.

The control program (CP) typically includes a transaction processing component (TPC) and a management component (MC).

The TPC offers a user a suite of transactions and services. The TPC provides the presentation functionality to guide the user through steps involved in a user-selected transaction, and provides the processing logic to lead the ATM 10 through steps involved in performing the user-selected transaction.

The management component (MC) records status, fault, and other information about the ATM, and captures and handles errors to ensure that the ATM does not unexpectedly go out of service. Furthermore, the MC provides supervisory functions to monitor and test operation of the devices and programs in the ATM.

To ensure that these devices and programs are operating correctly, an ATM has an elaborate state of health system. This state of health system also ensures that service personnel have access to diagnostic information about how the ATM is operating. This information typically includes logs and tallies about (i) the operations that each device has performed, (ii) the number of times a device has been used, (iii) any error messages reported by a device, and such like.

Different service personnel may have different levels of access to the ATM. For example, there may be three types of service personnel. A first type of service personnel may only be authorized to clear media jams, replenish non-currency media (such as receipt paper), and such like. These personnel are generally referred to as first line maintenance personnel and typically do not require any tools to perform their maintenance functions. A second type of service personnel may be authorized to perform diagnostic tests on some ATM devices, to reset certain logs and counters, and such like. These personnel are generally referred to as second line maintenance personnel, and typically carry a set of tools to help them perform their maintenance functions. A third type of service personnel may be authorized to replenish currency in the ATM. These personnel are generally referred to as currency replenishers, and typically do not perform any maintenance functions.

It is also important to ensure that each of the three types of authorized service personnel only has access to information consistent with their level of authorization. For example, only second level maintenance personnel should have access to certain highly secure information, such as tamper detection information; and only currency replenishers should have access to currency replenishment operations.

To provide a value-added maintenance service, an ATM vendor prefers to restrict access to detailed diagnostic information to service personnel associated with, or approved by, that vendor. It is therefore desirable to be able to restrict access to the most detailed information to those service personnel who are authorized by the ATM vendor, rather than to personnel who are authorized by the ATM owner. This is relatively easy to achieve if the ATM vendor uses proprietary hardware and software; however, to reduce the cost of an ATM, it is desirable to include as many non-proprietary devices and applications as possible, such as a Microsoft (trade mark) Windows (trade mark) operating system.

The Windows (trade mark) operating system includes an open management system referred to as Windows Management Instrumentation (WMI), which is proposed herein to be used to provide the state of health system in an ATM.

One disadvantage of using WMI is that it is an open management system, so there is no simple way to provide a level of access control to WMI that allows an ATM vendor to include intelligent management information and to discriminate between vendor authorized and vendor unauthorized client access thereto. WMI does provide a mechanism for using Windows (trade mark) authentication (such as domain logon credentials) as an authorization mechanism, but the set-up and management of Windows (trade mark) users controlled by the ATM owner, who has access to the ATM operating system, not the ATM vendor.

SUMMARY

It is among the objects of an embodiment of the present invention to obviate or mitigate the above disadvantage or other disadvantages associated with prior art open management systems, and/or prior art state of health systems.

According to a first aspect of the present invention there is provided a system for providing secure access to management information, the system comprising: an open management service including an open management application programming interface; a managed object generating management information; and an object interface for (i) receiving management information from the object, (ii) converting the received management information into a format accessible to the open management service, and (iii) providing the management information to the open management service in response to a valid request from a client; the system further comprising an authorization component for verifying an access code associated with the request to determine if the client is authorized to issue the request.

Preferably, the managed object generates management information associated with that object.

The managed object may be hardware (for example, a device) or software. The management information may relate to: operational information, such as the number of times a predetermined event has occurred; status information, such as the state of a sensor; or such like.

Preferably, the open management system implements Windows Management Instrumentation (WMI).

Preferably, the access code is provided as part of the request for management information. Conveniently, the access code is provided in the IWbemContext parameter field of an IWbemServices call to Windows (trade mark) Management. Windows Management makes no use of the information contained within an IWbemContext parameter field, but simply forwards it to the object interface.

The system may be incorporated within a self-service terminal (SST), such as an ATM.

This aspect of the present invention has the advantage that the object interface can determine whether a client application has sufficient authorization to permit the client to receive the requested information. This is a more secure method than relying on login credentials (such as a password) used to access the operating system, as these can be circumvented by the operator of the operating system. By ensuring that a valid access code is required for each request for management information, it is more difficult to circumvent this secure access system.

According to a second aspect of the present invention there is provided a method of providing secure access to management information in an open management system, the method comprising: receiving a request for management information from a client; analyzing the request to identify an access code indicating an authorization status of the client; and providing the requested management information to the open management service in the event that the authorization status satisfies a predetermined criterion.

Preferably, analyzing the request further comprises identifying a specific parameter field used to convey data, and reading the contents of that parameter field.

Preferably, the method further comprises accessing the requested management information and providing a subset of the accessed management information in the event that the authorization status does not satisfy the predetermined criterion. This ensures that some information may be viewed by any client, but other information is restricted to those clients that are authorized to view such information. When implemented in an ATM, this ensures that the ATM owner can use personnel not authorized by the ATM vendor, if the ATM owner so chooses. Alternatively, the method further comprises providing none of the requested management information in the event that the authorization status does not satisfy the predetermined criterion. This alternative may be used if the requested management information is highly secure information.

Preferably, the method further comprises providing the client with an access code for incorporating into a request for management information. This enables the access code to be incorporated automatically each time the client makes a request for management information.

Providing the client with an access code may be implemented by the client receiving an access code from a human operator, and incorporating the access code into a request for management information. The access code may be input from an operator by the operator typing the access code into the system, or by inserting storage media (such as a diskette, CDROM, DVD, or Flashcard) and transferring the access code from the storage media to the system, or by transmitting the access code from a portable device (such as a portable digital assistant or a cellular radio-frequency telephone) in a wireless manner. The storage media may be a diagnostic media including diagnostic commands and/or menus. Alternatively, providing the client with an access code may be implemented by providing the system with one or more dongles; or by providing software including the access code, where the software is accessible by the client.

The access code may include an access (or security) level, for example, level one, two, or three, where level three provides the most complete access to management information. The access code may also include an identifier indicating the identity of the owner of the system. This would enable an audit log to be kept to indicate which personnel accessed management information, when they accessed the information, and such like.

The access code is preferably encrypted to prevent anyone from tampering with the access code and increasing the security level to a level they are not entitled.

By virtue of this aspect of the present invention, the client application provides an access code with every request for management information. The access code is decoded, compared with a list of valid codes, and access is either granted, denied, or partially denied.

According to a third aspect of the present invention there is provided a self-service terminal comprising: a plurality of modules each module having one or more managed objects associated therewith for accessing management information associated with the module, and an object interface for (i) receiving management information from the objects, (ii) converting the received management information into a format accessible to a management service, and (iii) providing the management information to the management service in response to a request therefor.

BRIEF DESCRIPTION OF THE DRAWINGS

These and other aspects of the present invention will be apparent from the following specific description, given by way of example, with reference to the accompanying drawings, in which:

FIG. 6 is a table illustrating management information for one of the modules of FIG. 1;

FIG. 7 is a table illustrating access levels required to retrieve certain management information;

DETAILED DESCRIPTION

Figure 1:
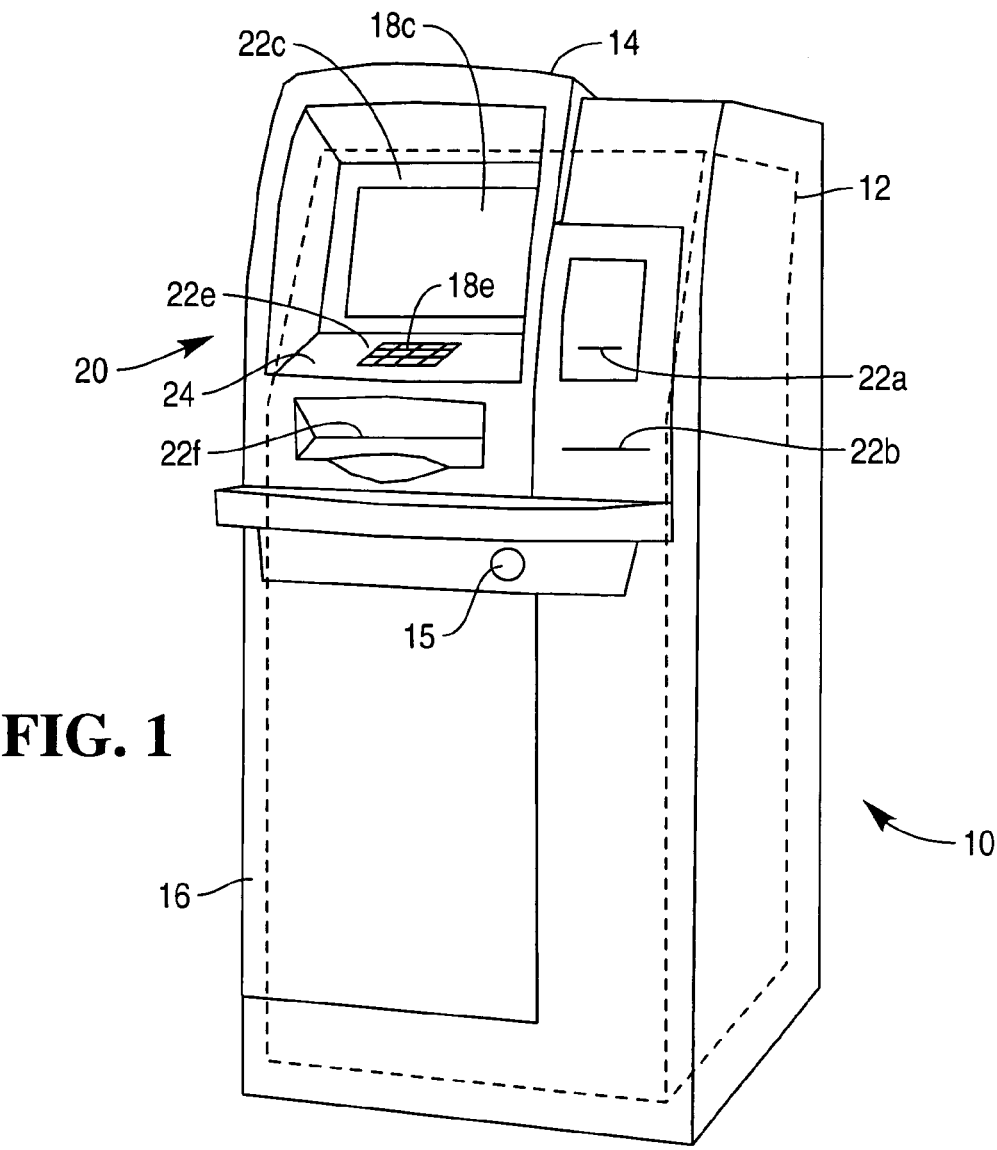
FIG. 1 is a perspective view of a self-service terminal including a secure access system implementing an open management system according to one embodiment of the present invention.
Figure 2:
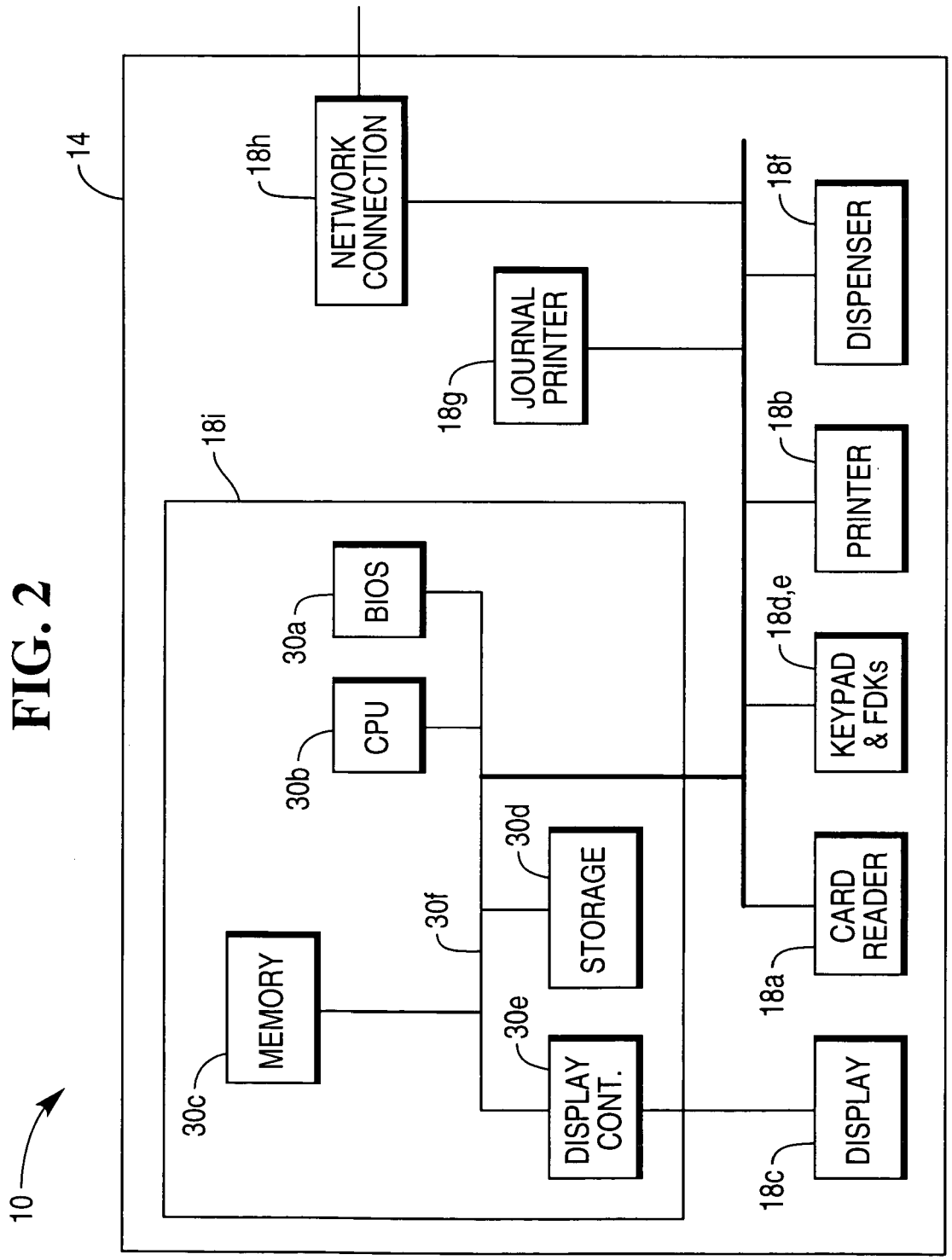
FIG. 2 is a simplified block diagram illustrating devices and modules within the terminal of FIG. 1.

Reference is first made to FIG. 1, which is a perspective view of a self-service terminal, in the form of an ATM 10, including a secure access system according to one embodiment of the invention. Reference is also made to FIG. 2, which is a schematic diagram illustrating the ATM 10 of FIG. 1 and showing internal devices mounted within the ATM 10.

The ATM 10 has a chassis 12 (shown in dotted line) to which is pivotably coupled a plastics fascia 14 covering an upper portion of the chassis 12, and secured thereto by a lock mechanism 15. A door 16 is hingably coupled to a lower portion of the chassis 12. When the fascia 14 is unlocked and hinged open and the door 16 is swung open, an operator can gain access to devices 18 located within the ATM 10.

The fascia 14 provides a user interface 20 to allow a user to interact with the ATM 10. In particular, the fascia 14 has apertures 22 aligning with some of the devices 18 when the fascia 14 is pivoted to the closed position.

The fascia 14 defines: a card reader slot 22a aligning with a card reader device 18a; a receipt printer slot 22b aligning with a receipt printer device 18b; a display aperture 22c aligning with a display 18c and associated function display keys (FDKs) 18d disposed as two columns, each on opposing sides of the display 18c; a keypad aperture 22e through which an encrypting keypad device 18e protrudes; and a dispenser slot 22f aligning with a dispenser device 18f.

With the exception of the encrypting keypad 18e, the devices 18 are all mounted within the chassis 12. The encrypting keypad 18e is mounted on a shelf portion 24 of the fascia 14, which extends outwardly from beneath the display aperture 22c.

Referring now to FIG. 2, the ATM 10 also includes the following internal devices 18 that are not directly viewed or accessed by a user during the course of a transaction. These devices 18 include: a journal printer device 18g for creating a record of every transaction executed by the ATM 10, a network connection device 18h for accessing a remote authorization system (not shown), and a controller device 18i (in the form of a PC core) for controlling the operation of the ATM 10, including the operation of the other devices 18. These devices 18g,h,i are all mounted within the chassis 12 of the ATM 10.

The controller device 18i comprises a plurality of modules, including: a non-volatile memory 30a storing a BIOS (BIOS NVRAM), a microprocessor 30b, main memory 30c associated with the microprocessor 30b, storage space 30d in the form of a magnetic disk drive, and a display controller 30e in the form of a graphics card.

The BIOS NVRAM 30a, microprocessor 30b, main memory 30c, disk drive 30d, and graphics card 30e are all replaceable modules within the controller device 18i.

As used herein, a module is a part of a device. Each device may have one or more modules.

The display 18c is connected to the microprocessor 30b via the graphics card 30e installed in the controller 18i and one or more controller buses 30f. The other ATM devices (18a, b, and 18d to 18h) are connected to the ATM controller 18i via the one or more controller buses 30f.

Each device 18, and some modules within a device 18 (for example, the microprocessor 30b, main memory 30c, disk drive 30d, and graphics card 30e), are managed objects. In this embodiment, a managed object is a logical component (for example a disk partition) or a physical component (for example a device) within the ATM 10 that is capable of providing management information.

Figure 3:
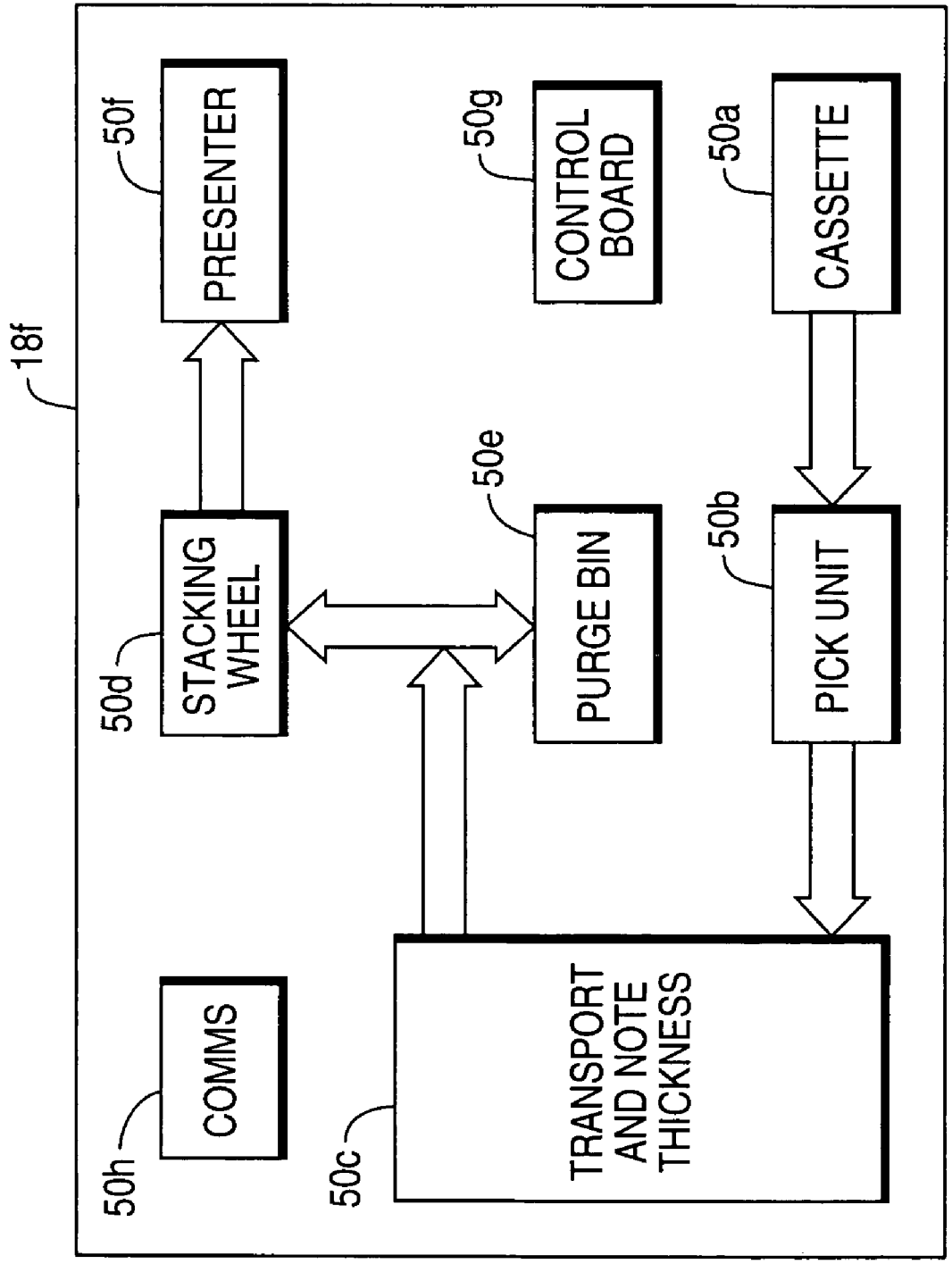
FIG. 3 is a block diagram illustrating modules within a cash dispenser of FIG. 2.

Reference is now made to FIG. 3, which is a block diagram illustrating modules within the cash dispenser device 18f.

The cash dispenser 18f has a cassette module 50a for holding currency to be dispensed. A pick module 50b is provided for picking currency items (banknotes) from the cassette 50a and conveying them to a transport and note thickness module 50c. The transport module 50c conveys the picked banknote from the pick module 50b to a stacking wheel module 50d. The transport module 50c also detects the thickness of the picked banknote to determine if more than one banknote has been picked in a single operation. If more than one banknote has been picked, the picked banknotes are conveyed to a purge bin 50e instead of the stacking wheel 50d. If only one banknote has been picked, then that banknote is transported to the stacking wheel 50d. Once all requested banknotes have been picked and transported to the stacking wheel 50d, the banknotes are stripped from the stacking wheel 50d as a bunch and presented to an ATM customer via a presenter module 50f. A control board 50g is provided to control the operation of the cash dispenser 18f, and a communications module 50h is provided to communicate with the controller device 18i.

Initialization of the ATM

When the ATM 10 is booted up, the microprocessor 30b accesses the magnetic disk drive 30c and loads the main memory 30c with software components, as will be described with reference to FIG. 4, which is a schematic diagram illustrating how software components interact in main memory 30c.

Operating System

The microprocessor 30b loads an operating system kernel 60 into the main memory 30c. In this embodiment, the operating system is a Windows NT (trade mark) operating system, available from Microsoft Corporation. The operating system includes a plurality of device drivers 62a,b, . . . for interfacing with standard computing devices such as the magnetic disk drive 30d, the display 18c, a serial port, a parallel port, and such like. For clarity, only two device drivers 62a,b are illustrated in FIG. 4.

As is well known in the art, the operating system kernel 60 is responsible for memory, process, task, and disk management, and includes routines for implementing these functions.

The operating system 60 includes an open management service 64 in the form of a Windows (trade mark) WMI service 64.

The operating system 60 also includes a registry 66, and a plurality of standard providers 68. Although there are many standard providers 68, for clarity, only three are shown in FIG. 4. These standard providers 68 are supplied by Microsoft with the Windows (trade mark) NT operating system and interface with standard PC devices and components (such as the registry 66, main memory 30c, a USB port, and such like). Providers 68 expose a rich set of instrumentation information for the devices and components they are associated with.

Run-Time Platform

The microprocessor 30b also loads a run-time platform 70 into the main memory 30c. In this embodiment, the runtime platform 70 is a set of APTRA (trade mark) XFS components, available from NCR Corporation, 1700 S. Patterson Blvd., Dayton, Ohio 45479, U.S.A. The run-time platform 70 provides a range of programming facilities specific to self-service terminal devices and services.

One function of the run-time platform 70 is to enhance the operating system 60 so that the operating system and run-time platform 70 together provide high level access to all of the devices 18, including both standard computing devices (via the operating system 60), and non-standard computing devices (via the run-time platform 70). Thus, the combination of the run-time platform 70 and the operating system 60 can be viewed as providing a complete ATM operating system.

The platform 70 comprises a plurality of self-service device drivers 72a,b, . . . that interface with self-service specific devices. Although only two device drivers 72 are shown, there are many device drivers in the platform 70, one for each self-service specific device, such as the card reader 18a, the receipt printer 18b, the FDKs 18d, the encrypting keypad 18e, and the cash dispenser 18f. Furthermore, there are many more devices 18 in an ATM than those described herein, for example there are more standard computing devices such as serial ports and a parallel port, there are also more self-service devices such as a rear operator panel. These devices are not discussed herein because they are not essential to an understanding of the invention.

The platform 70 also includes support files (not shown) for use with the self-service drivers 72 to allow each device 18 to operate. For each self-service device 18, the driver 72 and any associated support files enable that device 18 to be operated, tested, maintained, and configured. The platform 70 also includes drivers to facilitate encrypted communication between the devices 18, for example, between the card reader 18a and the controller 18i, between the printer 18b and the controller 18i, and such like.

If a new device is to be added to the ATM 10, then a corresponding driver and any associated support files are also added. Thus, the platform 70 provides the environment needed for the ATM's self-service devices to be operated and maintained.

The platform 70 also includes a plurality of self-service specific providers 74 (labeled 74a,b . . . ).

In general, there is at least one provider for each managed object, but there may be more than one provider for each object.

Control Program

The microprocessor 30b also loads a control program (CP) 80 into the main memory 30c. The CP 80 comprises a transaction processing component (TPC) 82 and a management component (MC) 84. The management component 84 also includes an access control (AC) sequence 86, which is described in more detail below.

The CP 80 interfaces with the platform 70 via an open financial interface 90 and an open management interface 92. The open financial interface 90 is a standard interface for making use of self-service devices 18 (referred to herein as a CEN XFS API). This CEN XFS interface is used to instruct the devices 18 to perform operations. The open management interface 92 is an API (application programming interface) in the Windows (trade mark) operating system implementing WMI. The WMI interface 92 is used to obtain management information including device status and fault data.

The TPC 82 provides processing logic and presentation information to allow a customer to execute a transaction at the ATM 10 by controlling the presentation of screens to an ATM customer to guide a customer through a transaction.

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a customer entry or activity relating to the current screen. For example, a first screen may request a customer to insert a card; once a card has been inserted a second screen may invite the customer to enter his/her PIN; once the final digit of the PIN has been entered, a third screen may invite the customer to select a transaction; and so on.

The TPC 82 also provides processing logic and presentation information (typically presented on a rear operator panel, which is not shown in the drawings) to allow maintenance personnel (such as technicians or replenishers) from a service organization to execute replenishment or diagnostic operations at the ATM 10. The TPC 82 controls the presentation of information to an ATM service engineer to guide the engineer through a replenishment or diagnostic operation.

The management component (MC) 84 performs device management functions. The MC 84 records information relating to the status and operation of the ATM 10. For example, the MC 84 records when an ATM customer is using the ATM 10, and when a maintenance person (or other authorized person) is replenishing, maintaining, or diagnosing the ATM 10.

The MC 84 also provides an operator (not an ATM customer, but a maintenance person such as a service engineer or other authorized person) with access to functions required to configure, diagnose, and maintain the ATM 10.

The CP 80 is a management program that accesses management information from managed objects using the WMI service 64.

WMI Architecture in the ATM

Figure 4:
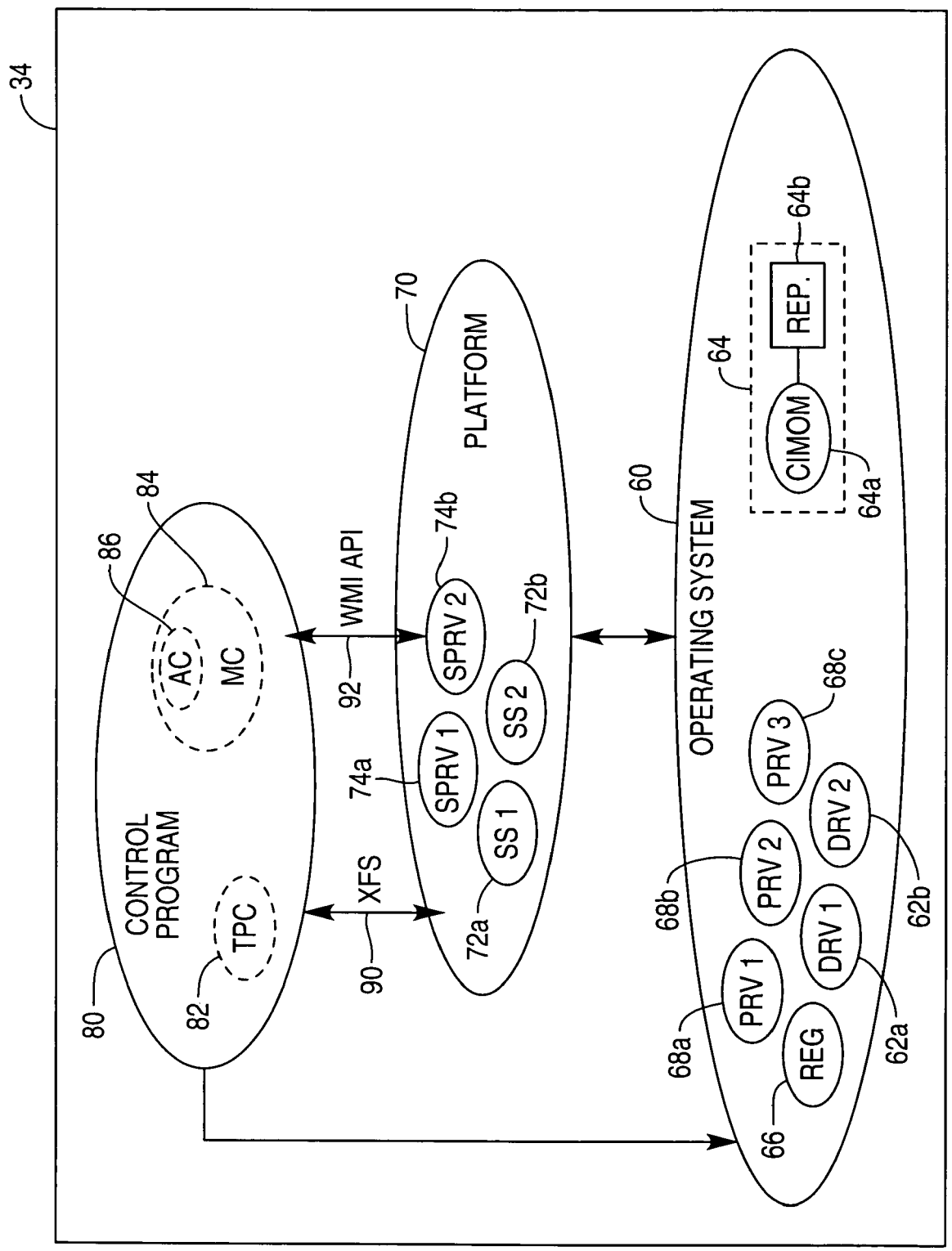
FIG. 4 is a schematic diagram illustrating software components executing in a memory of the terminal of FIG. 1.
Figure 5:
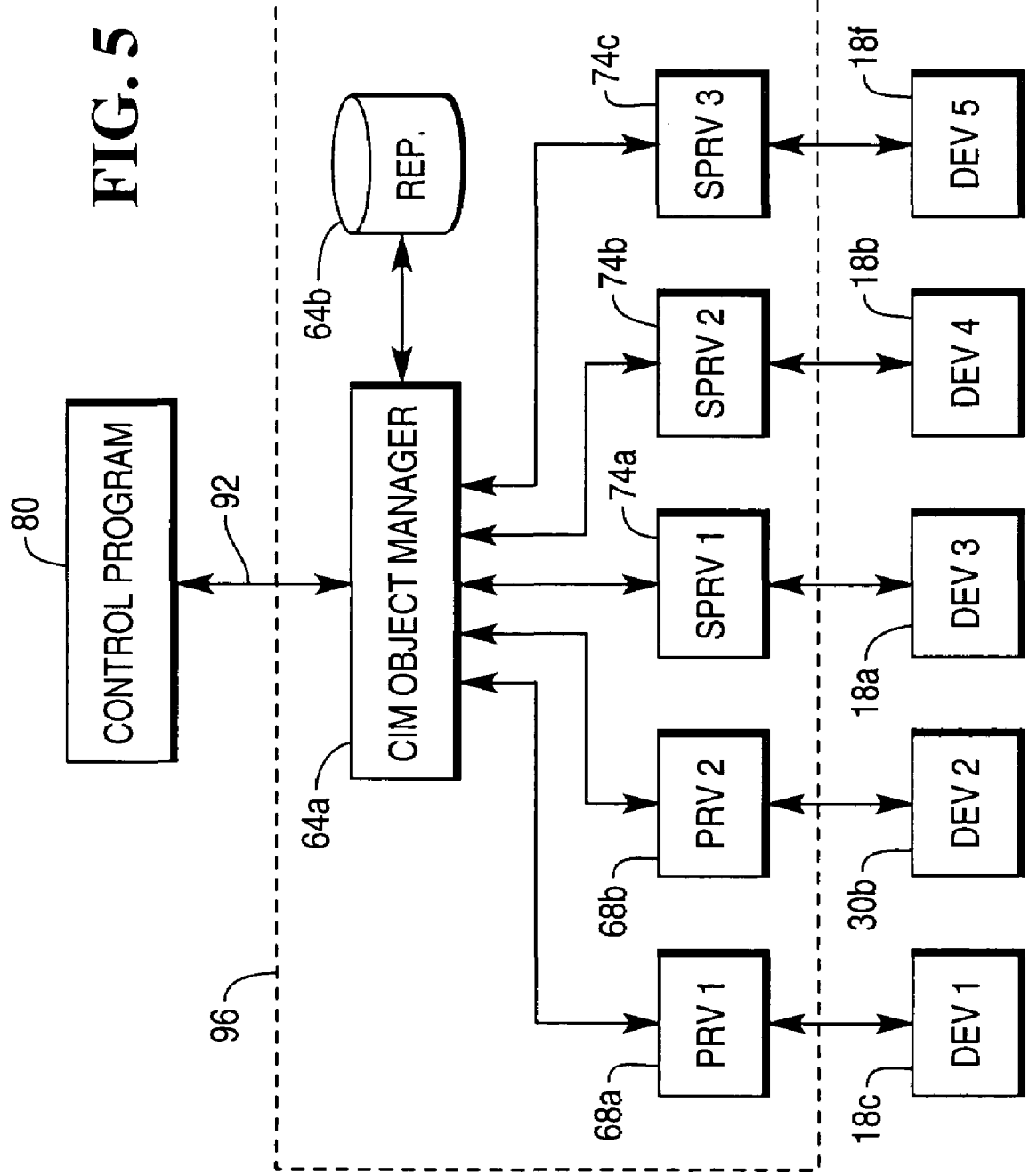
FIG. 5 is a block diagram illustrating the open management system architecture in the terminal of FIG. 1.

Reference is now also made to FIG. 5, which is a block diagram illustrating the WMI architecture shown in FIG. 4.

WMI is built on an industry standard known as the Common Interface Model (CIM). CIM defines an object oriented model and meta-model for defining managed entities. CIM provides a consistent definition and structure of data, including expressions for elements such as object classes, properties, associations and methods.

The WMI service 64 moves and stores information about managed objects and comprises: a CIM object manager (CIMOM) 64a, and a repository 64b.

The CIMOM 64a performs a broker function that registers all managed objects and the classes associated with those managed objects, and stores this information as a mapping in the repository 64b. This enables the CIMOM 64a to determine what managed objects to access in response to a query received from the CP 80.

In addition to the mapping information, the repository 64b stores WMI-related static data. This static data may include information such as the weight of each device.

Managed objects include, the operating system 60, the registry 66, file systems, devices 18, modules in devices (for example, modules 50a to 50h), driver information, and such like.

The WMI service 64 acts as a mediator between the control program 80 and a provider 68,74. The provider may be either standard (that is, non-proprietary) 68, or self-service specific 74. Providers communicate with the WMI service 64 via a COM interface. Each provider is associated with a managed object (such as a device 18, a module within the device, the registry 66, or such like). A managed object communicates with the WMI service 64 via its dedicated provider 68,74.

The WMI service 64 knows where to pass information because the providers 68,74 register their location with the WMI service 64 (using the CIMOM 64a as a broker). Each provider 68,74 also registers its support for particular operations, such as data retrieval, modification, deletion, enumeration, or query processing. The WMI service 64 uses this provider registration information to match CP 80 requests with the appropriate provider 68,74.

The WMI service 64 interacts with the CP 80 through a COM (component object model) interface. When a management client makes a request through the COM interface, the WMI service 64 determines whether the request involves static or dynamic data. If the request involves static data, such as the name of a managed object, the CIMOM 64a retrieves the data from the repository 64b. If the request involves dynamic data, such as the amount of memory a managed object is currently using, the CIMOM 64a always passes the request on to a provider 68,74 associated with the managed object.

The main purpose of the provider 68,74 is to extract management information from the managed object using whatever interface the managed object presents. The extracted management information is then mapped into object classes compatible with WMI.

When a provider 68,74 finishes processing a request (by extracting information and then mapping the extracted information), the provider returns the result (object classes) back to the CIMOM 64a. In turn, the CIMOM 64a forwards the result on to a management client through the COM interface.

The CP 80 and the providers 68,74 access CIM classes via the WMI service 64. CIM classes are populated, typically using a Managed Object Format (MOF) compiler, and added to the WMI repository 64b to enable them to be accessed by the CP 80 and the providers 68,74. MOF is the language used to describe the providers 68,74 and CIM classes so that the WMI service 64 can understand their functions. For each class, the MOF file contains the access level and the provider for that class.

The WMI service 64, standard providers 68, self-service specific providers 74, and WMI API 92 comprise an open management system 96 providing secure access to management information.

Reference is now also made to FIG. 6, which is a table 100 listing examples of statistical information available from a pick module statistics class associated with the pick module 50b.

In table 100, there are four columns.

The first column 102 indicates the name used by a method call to retrieve information. This information may be fixed, such as the caption or description of the pick module; or this information may be variable, such as counter information.

The second column 104 indicates the source of the information to be retrieved, which may be either the MOF or the provider 74. If the source of the information is the MOF, then the information (that is, the value to be retrieved) is hard-coded into the pick module MOF, so it is static information retrieved from the repository 64b. If the source of the information is the provider 74, then the pick module provider dynamically provides the value of the information.

The third column 106 indicates if the statistical information can be reset. This only applies to the variable information; that is, the counters.

The fourth column 108 provides some comments.

Some of the counters are relative: indicating the number of tallies since the counter was last reset. An example of this is the "BillsPicked" counter (row 112). Other counters are absolute: indicating the number of tallies since the pick module 50b was installed. An example of this is the "TotalBillsPicked" counter (row 114).

Other counters listed in table 100 are self-explanatory and are listed to illustrate some of the management information that may be obtained using the open management system 96.

Reference is now also made to FIG. 7, which is a table 120 listing examples of some CIM classes that are used for obtaining management information from managed objects in ATM 10. These CIM classes are accessed by the CP 80 and the providers 68,74 to convey information there between.

CIM class table 120 comprises three columns for each CIM class entry: an NCR base CIM class column 122 indicating the name of an NCR base CIM class; an access level column 124 indicating what level of access rights are required to view information from that CIM class; and a description column 126 giving a textual description of the function of the CIM class.

The NCR base CIM classes are those classes that are common to all the self-service specific devices in the ATM 10; that is, these classes are available for every self-service specific device in the ATM 10. For example, there will be an "NCR_Dispenser" class for the cash dispenser 18f that corresponds to the "NCR_Device" base CIM class; there will also be an "NCR_Printer" class for the receipt printer 18b that corresponds to the "NCR_Device" base CIM class. The non-self-service specific devices (for example, communication ports, network cards, and such like) have different class hierarchies.

The NCR base CIM classes are defined in a base MOF file. The base MOF file includes information about the level of authorization required by that class. In this way, the NCR base CIM classes define the access level for all sub-classes, and this access level is propagated to all sub-classes and instances.

Each row entry in CIM class table 120 relates to a different CIM class. For example, row 128 contains a CIM class referred to as "NCR_Device", which provides details of the device being queried. In this embodiment, at least one instance of this class ("NCR_Device") exists at all times, and its values persist even after an ATM reset operation is performed. Another example is row 130, which contains a CIM class referred to as "NCR_DevicePart", which provides information about parts, or modules, within a device being queried. For example, if the pick module 50*b* is queried, then the "NCR_Device" class would return, as shown in row 116 of FIG. 6, "NCR_CashDispDevice"; and the "NCR_DevicePart" class would return "PickModule".

There are three access levels listed in CIM class table 120: level 0, 1, and 2. Level 0 allows all WMI clients (such as CP 80) to have unrestricted access to information contained within that CIM class; level 1 requires a first level of authorization; level 2 requires a higher level of authorization than level 1. Therefore, level 2 access is used for the most sensitive information. In this embodiment, level 2 access is restricted to service personnel approved by NCR Corporation (trade mark), because NCR Corporation is the vendor of the ATM 10 in this embodiment.

Because the NCR base CIM class includes the access level indication, this access level indication is propagated to all sub-classes and instances of these classes. This is achieved by a using a qualifier in each sub-class and instance derived from the NCR base CIM class. Furthermore, access levels can be applied to classes that do not inherit from NCR base CIM classes.

The CP 80 and the providers 68,74 use an IWbemServices interface to convey an access code for validating that the CP 80 is authorized to access management information. More information on the IWbemServices interface, and on WMI in general, is available from Microsoft Corporation (trade mark), and at http://msdn.microsoft.com.

Figure 8:
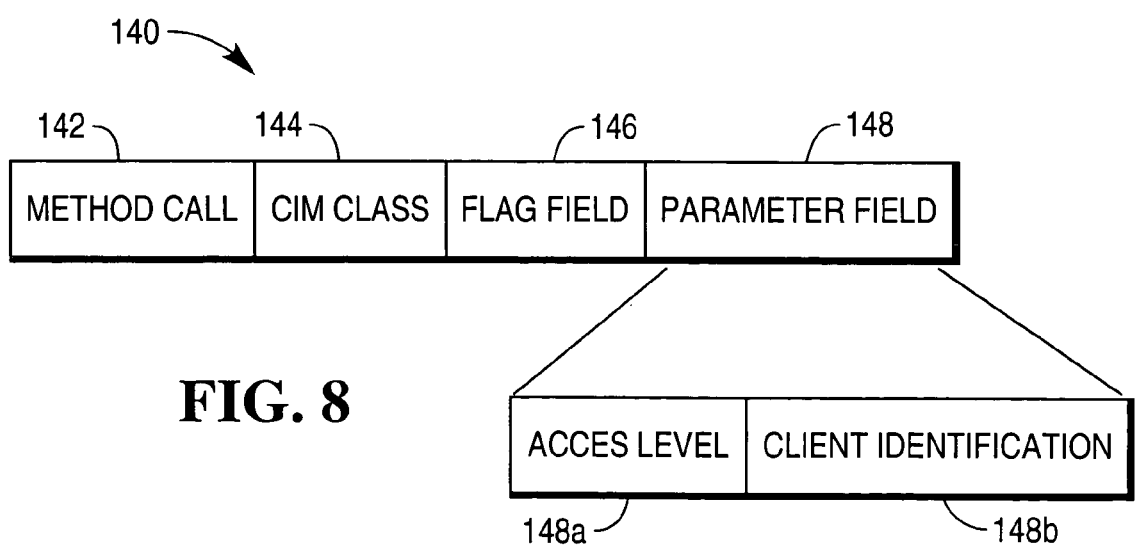
FIG. 8 is a schematic diagram illustrating typical information that is conveyed across an interface in the open management system of FIG. 5.

FIG. 8, to which reference is now also made, illustrates typical information conveyed across the IWbemServices interface. The IWbemServices information 140 typically comprises a method call field 142 indicating a function to be performed; a CIM class field 144 for identifying a managed object on which the function is to be performed; a flag field 146 for modifying or qualifying the function; and a parameter field 148.

The parameter field 148 contains an IWbemContext object, which is used to convey additional information to providers 68,74. In this example, an access control (AC) sequence 86 (FIG. 4) is used as context values for the IWbemContext object; that is, the AC sequence 86 is used by the control program 80 to populate the IWbemContext object.

The AC sequence 86 comprises an access level field 148*a* and a client identifier field 148*b*. In this embodiment, there are only three different access levels (0 to 2), so the access level field 148*a* only needs to be a two bit field; however, a 32-bit unsigned long ("VT_UI4") context value is used for the access level field 148*a*, and the other bits are used as padding to improve security. The client identifier field 148*b* is a thirty-two bit field that uniquely identifies the owner of the ATM 10, so a 32-bit unsigned long ("VT_UI4") context value is used for the client identifier field 148*b*. A third 32-bit unsigned long ("VT_UI4") context value is used to provide a digital signature and/or checksum for the first two context values, to reduce the possibility of tampering with the access level field 148*a* and/or the client identifier field 148*b*. The first two context values are encrypted using a secret algorithm, and a digital signature and/or checksum for the encrypted first two context values is provided as the third context value to prevent tampering (for example, by changing the access level). The AC sequence 86 comprises the three encrypted context values, and is stored in the CP 80 in that form.

In this embodiment, the CP 80 has an access level 2 coded into the access control sequence 86. This enables the CP to retrieve any information from the CIM classes listed in CIM class table 120 (FIG. 7).

The standard providers 68 do not assess the access level of the CP 80. This is because the standard providers 68 are used to obtain information about non-proprietary devices, and all management information associated with the non-proprietary devices is made available to any client requesting the information.

Creating Base CIM Classes

The self-service providers 74 must be able to determine what access level is required to access each class to enable them to limit access to a CP 80 having the required access level for receiving the information requested. This is achieved by adding qualifiers to each class when that class is created. Qualifiers are the generic mechanism CIM provides for incorporating additional information into classes.

In the open management system 96, the MOF file for every object class is populated with two qualifiers: a name string matching the name of the defined base class; and an access level string that combines the name of the defined base class and the client (CP 80) access level required to allow the client to access information associated with that class.

The name string corresponds to the name of the NCR base CIM class listed in column 122 of table 120 (FIG. 7). The access level in this embodiment is either zero, one, or two. When a class is derived from another class, for example "Dispenser_TamperDetails" would be derived from "NCR_TamperDetails", then the name string qualifier of the derived class is the name of the class from which it is derived. Thus, the "Dispenser_TamperDetails" class has a name string qualifier with the text "NCR_TamperDetails". For each class, the associated MOF file includes details of the access level and any class from which that class is derived.

Both the name string and the access level are combined and encrypted using a secret algorithm, the result is then stored in the access level string as a double word value. The access level string may also be digitally signed and/or check-summed. This may be used to reveal any subsequent tampering, for example, to reduce the access level. The contents of the access level string then serve as a signature for defining access to a class and for validating that the access level required to access that class has not been modified.

When a self-service provider 74 decrypts the access level string, it compares the contents of the name string with the decrypted name from the access level string to ensure that they match. If there is no match, then the name in the name string may have been changed. This may indicate that the class name has been changed to obviate the security provisions provided by the access level.

If someone attempts to breach security by changing both the access level string and the name string, then the provider 74 can determine from the associated MOF file that the class is not actually derived from the class identified by the modified qualifier name string, and prevent access to the requested information. If they take a further step to alter the actual base class defined by the MOF files, then the provider will no longer function correctly since the class definition will be incorrect.

WMI does not support passing of IWbemContext objects during an event registration process or at the point of event indication. To overcome this potential hole in security, this embodiment only permits event notifications that indicate what managed object should be queried by the CP 80; thereby ensuring that a query must be made before the information is divulged.

Request for Information

Figure 9:
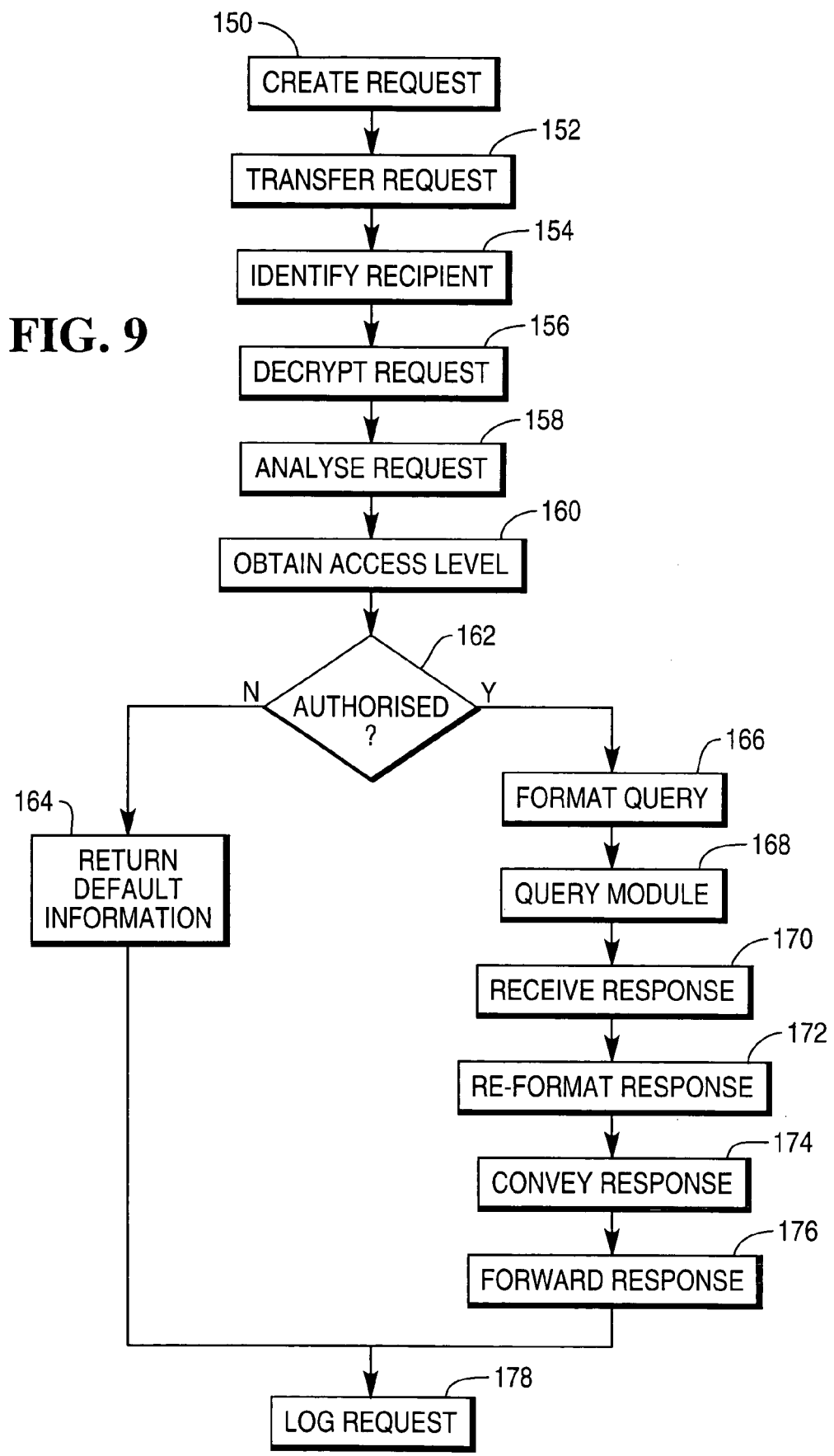
FIG. 9 is a flowchart illustrating a query made by the open management system of FIG. 1.
Figure 10:
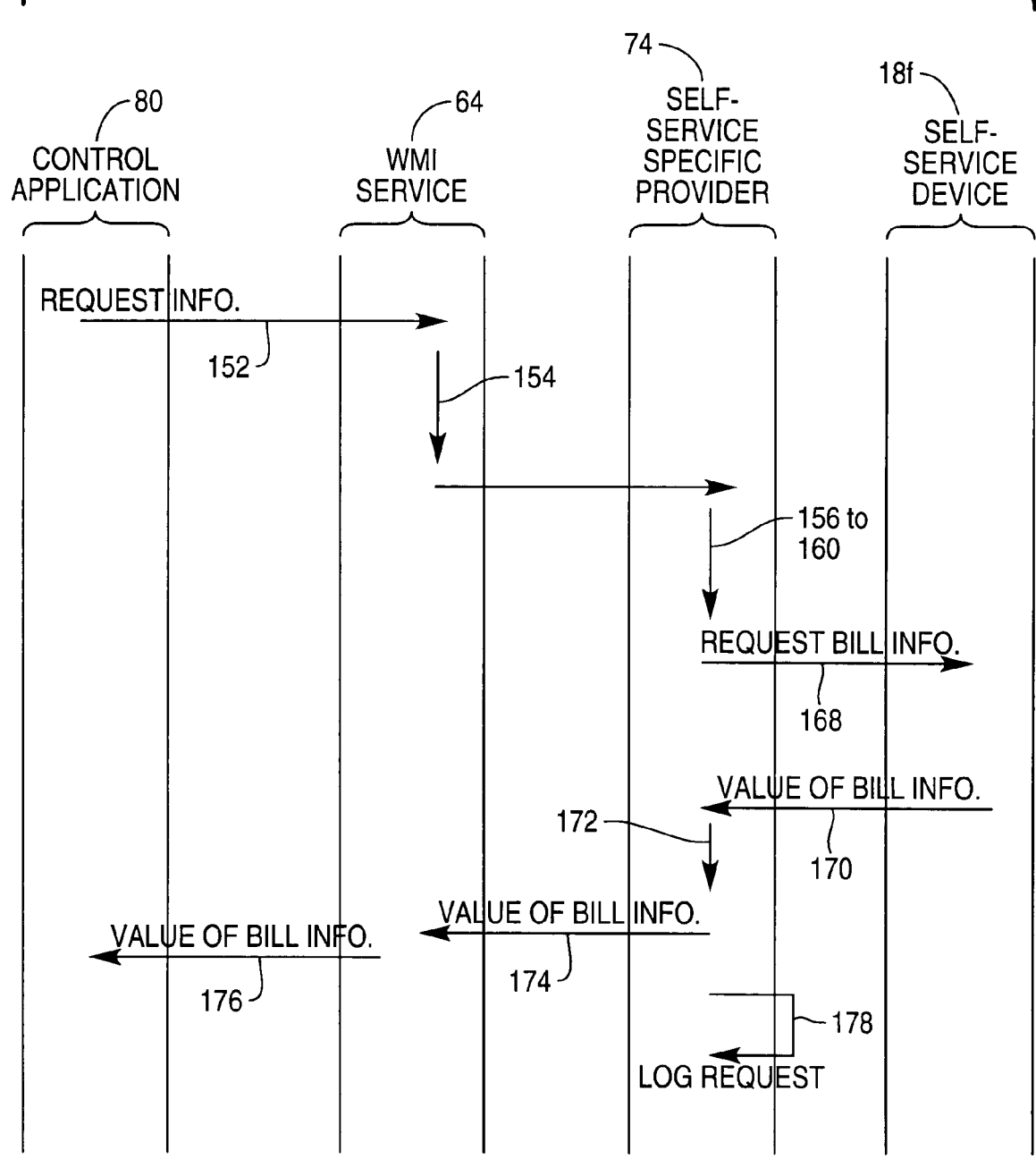
FIG. 10 is a schematic diagram illustrating the steps of the flowchart in FIG. 9.

Operation of the open management system 96 within the ATM 10 will now be described with reference to FIG. 9, which is a flowchart illustrating a query made by the CP 80 for statistical information, and FIG. 10, which illustrates FIG. 9 pictorially.

The CP 80 (which is a WMI management client) creates a request (step 150) for information. In this example, the request is for statistical information from the pick module, in particular, the request is for the number of bills picked since a bill pick counter in the module was last reset.

The NCR base CIM class used is shown in row 132 of table 120 (FIG. 7). The request takes the form: "IWbemServices::CreateInstanceEnum("BillsPicked", flags,pIWbemContext (<level 2 access code>)".

The created request is then transferred (step 152) from the CP 80 to the WMI service 64.

The CIMOM 64*a* receives the request, determines which provider should receive the request by accessing from the repository 64*b* a list of the managed objects that support the function requested, and conveys the request to the appropriate provider 68,74 (step 154). In this example a self-service provider 74 (the dispenser provider) is determined to be the appropriate recipient of the request.

The provider 74 receives the request, decrypts (step 156) the IWbemContext object (from the parameter field 148*b* of the IWbemServices information 140) containing the access control sequence 86, and then analyses (step 158) the decrypted AC sequence 86 to determine the identification of the client management program (CP 80) and the level of authorization of the client management program.

The provider 74 accesses the repository 64*b* to obtain the access level required to receive this information (step 160).

The provider 74 then compares (step 162) the CP 80 access level (from the decrypted AC sequence 86) with the required access level to determine if the CP 80 is authorized. The provider 74 also ensures that the name string qualifier and the access level qualifier for that class are correct and match the corresponding details in the MOF file for that class.

The access level required for this request is level 2, as indicated in row 132 of table 120 (FIG. 7), so the CP 80 does have the required level of access. However, if the CP 80 did not have the required level of access, then the provider 74 would return a result indicating that there are no instances of the class available; in other words, it would respond (step 164) to the CP 80 but it would not provide the requested information.

In this example, the CP 80 does have the required access level. The provider 74 uses proprietary commands to retrieve the information, so the provider 74 first converts the request from WMI format to the proprietary format (step 166).

The provider 74 uses this format to query (step 168) the pick module 50*b* to obtain the value of the number of bills picked since the counter was last reset.

The pick module 50*b* responds to the provider 74 (step 170) by providing the requested information in the proprietary format.

The provider 74 converts the requested information from the proprietary format to the WMI format (step 172), and then responds (step 174) to the CIMOM 64*a* by conveying the WMI format information.

The CIMOM 64*a* responds to the CP 80 (step 176), so the CP 80 receives the value requested, which is the number of bills picked since the pick module counter was last reset.

The CP 80 can use this information itself or can forward to some other entity, either within or external to the ATM 10. For example, the CP 80 may provide an operator interface to allow an ATM engineer to obtain statistical information from the ATM devices 18 and modules via the CP 80.

The provider 74 also logs (step 178) the request in a file on the controller device 18*i*. The provider 74 records the client identification, together with the request that was made, and an indication of whether the client was authorized to make the request. This file serves as a log that can be used as an audit trail.

It will now be appreciated that this embodiment of the present invention allows an ATM vendor to limit access to sensitive data to those applications and personnel having the required access level.

Various modifications may be made to the above described embodiment within the scope of the present invention; for example, in other embodiments, an SST other than an ATM, for example, a non-cash kiosk, may be used.

In other embodiments, the format of the data structures, the number of fields, the number of bits in a field, and such like, may differ from those described in the above embodiment.

In the above embodiment, keyless encryption is used to encrypt the access control object 86, which means that the algorithm used is fixed, and provides security that is similar to a client-specific password scheme. This is a balance between security and operational overhead. As ATMs may not have the required infrastructure to cope with secure key management for applications, an audited password-based scheme is selected as a reasonable compromise. However, in other embodiments, more robust encryption techniques may be used, such as secret key encryption, public/private key encryption, and such like.

In other embodiments, the management information provided may vary from that described above.

In the above embodiment, the authorization component is implemented by the providers; however, in other embodiments, the authorization component may be implemented by a different software routine.

In other embodiments, the access codes used by a client may be centrally managed by a SST vendor. Because there is no protection against copying access codes from one SST to another (which is analogous to divulging a password), it is important to maintain an accurate audit trail, not just for one SST, but for a network of SSTs. Such an audit trail would be used to trace a particular WMI client using an access code at an SST to the original licensed user or entity associated with that access code. A database storing client identifiers and associated licensee information may be provided. The client identification codes used at each SST are logged and/or reported as WMI events so that the database receives this information automatically.

What is claimed is:

1. A computer-based system for providing unsecure access to management information about non-proprietary managed objects, and secure access to management information about proprietary managed objects in response to a request from a client application having the required access level for receiving management information from proprietary managed objects, the system comprising:

an open management service including an open management application programming interface;

a plurality of managed objects including at least one non-proprietary managed object and at least one proprietary managed object;

a non-proprietary object interface for (i) electronically on a processor receiving management information from the non-proprietary managed object, (ii) converting the received management information into a format accessible to the open management service, and (iii) providing converted management information to the open management service in response to the request from the client application, without having to identify that an access code has been transmitted as part of the request; and a proprietary object interface for (i) receiving management information from the proprietary managed object, (ii) converting the received management information into a format accessible to the open management service, (iii) identifying an access code transmitted by the client application as part of the request, and (iv) independent of login credentials of a user of the system, providing converted management information to the open management service in response to the request from the client application only in the event that the identified access code matches an entry in a list of valid access codes so as to limit access to management information from proprietary managed objects to those client applications having the required access level for receiving management information from proprietary managed objects; wherein (i) the list of valid access codes is held within a repository in the open management service, and (ii) the repository comprises a plurality of Common Interface Model (CIM) classes, each CIM class having an associated access level indicating the access code required to receive management information about that CIM class.

2. A computer-based system according to claim 1, wherein (i) the proprietary object interface is operable to identify the access code by decrypting an encrypted object from a parameter field of the request, and (ii) the non-proprietary object interface is operable to ignore contents of the parameter field of the request.

3. A computer-based system according to claim 2, wherein the proprietary object interface is operable to analyze the decrypted object to determine an identification of the client application and the level of authorization of that client application.

4. A computer-based system according to claim 1, wherein the open management service implements Windows Management Instrumentation.

5. A computer-based system according to claim 1, wherein the access code is provided in an IWbemContext parameter field of an IWbemServices method call.

6. A computer-based system according to claim 1, wherein the proprietary object interface is operable to log the request from the client application in a file which comprises a client identification, information about the request from the client application, and an indication of whether the client application was authorized to make the request.

7. A computer-based system according to claim 1, wherein the system is incorporated within a self-service terminal.

8. A method of operating a self-service terminal having at least one non-proprietary managed object and at least one proprietary managed object, the method comprising:
electronically on a processor receiving first management information from the non-proprietary managed object;
converting the first management information received from the non-proprietary managed object into a format which is accessible to an open management service;
providing converted first management information to the open management service in response to a request from a client application, without having to identify that an access code has been transmitted as part of the request;
receiving second management information from the proprietary managed object;
converting the second management information received from the proprietary managed object into a format which is accessible to the open management service;
identifying an access code transmitted by the client application as part of the request from the client application;
comparing the identified access code with entries in a list of valid access codes; and
in the event of a match, providing converted second management information to the open management service independent of login credentials of a user, so as to limit access to management information from proprietary managed objects to those client applications having the required access level for receiving management information from proprietary managed objects; wherein (i) the list of valid access codes is held within a repository in the open management service, and (ii) the repository comprises a plurality of Common Interface Model (CIM) classes, each CIM class having an associated access level indicating the access code required to receive management information about that CIM class.

9. A method according to claim 8, wherein identifying an access code includes decrypting an encrypted object from a parameter field of the request.

10. A method according to claim 9, further comprising analyzing the decrypted object to determine an identification of the client application and the level of authorization of that client application.

11. A method according to claim 8, wherein the access code is provided in an IWbemContext parameter field of an IWbemServices method call.

12. A method according to claim 8, further comprising logging the request from the client application in a file which comprises a client identification, information about the request from the client application, and an indication of whether the client application was authorized to make the request.

* * * * *